United States Patent
Sakamoto et al.

(10) Patent No.: US 8,064,030 B2
(45) Date of Patent: Nov. 22, 2011

(54) LIQUID CRYSTAL DISPLAY DEVICE WITH COMMON ELECTRODE LINE AND SEAL MEMBER AT DIFFERENT POSITIONS

(75) Inventors: Michiaki Sakamoto, Kanagawa (JP); Kenichi Mori, Kanagawa (JP); Kenichirou Naka, Kanagawa (JP); Hiroshi Nagai, Kanagawa (JP)

(73) Assignee: NED LCD Technologies, Ltd., Kanagawa (JP)

( * ) Notice: Subject to any disclaimer, the term of this patent is extended or adjusted under 35 U.S.C. 154(b) by 461 days.

(21) Appl. No.: 12/122,236

(22) Filed: May 16, 2008

(65) Prior Publication Data

US 2008/0284927 A1 Nov. 20, 2008

(30) Foreign Application Priority Data

May 18, 2007 (JP) ................. 2007-133431

(51) Int. Cl.
*G02F 1/1339* (2006.01)
*G02F 1/1343* (2006.01)

(52) U.S. Cl. .................. 349/153; 349/190; 349/141

(58) Field of Classification Search .................. 349/114, 349/141–144, 153, 190
See application file for complete search history.

(56) References Cited

U.S. PATENT DOCUMENTS

| | | | |
|---|---|---|---|
| 2005/0264731 A1* | 12/2005 | Itou et al. | 349/114 |
| 2006/0215086 A1* | 9/2006 | Kurasawa | 349/114 |
| 2006/0215087 A1* | 9/2006 | Matsushima et al. | 349/114 |
| 2007/0002226 A1* | 1/2007 | Sakamoto et al. | 349/114 |

FOREIGN PATENT DOCUMENTS

| | | |
|---|---|---|
| CN | 1693945 A | 11/2005 |
| CN | 1892349 A | 1/2007 |
| JP | 2003344837 | 12/2003 |
| JP | 2007041572 | 2/2007 |

* cited by examiner

*Primary Examiner* — Hoan Nguyen
(74) *Attorney, Agent, or Firm* — Sughrue Mion, PLLC

(57) ABSTRACT

A liquid crystal display device includes an array of pixels each including a plurality of sub-pixels, a plurality of pixel electrodes disposed in the respective sub-pixels, and a plurality of common electrodes disposed in the respective sub-pixels. The common electrode disposed in each of the sub-pixels in one of the pixels on each row is connected to the common electrodes disposed in the corresponding sub-pixels in the others of the pixels on the each row, to form a group of common electrodes connected together.

14 Claims, 15 Drawing Sheets

LIQUID CRYSTAL DISPLAY DEVICE WITH COMMON ELECTRODE LINE AND SEAL MEMBER AT DIFFERENT POSITIONS

This application is based upon and claims the benefit of priority from Japanese patent application No. 2007-133431 filed on May 18, 2007, the disclosure of which is incorporated herein in its entirety by reference.

FIELD OF THE INVENTION

The present invention relates to a liquid crystal display (LCD) device and a terminal unit and, more particularly, to LCD device including a plurality of sub-pixels in each pixel and a terminal unit including the LCD device.

BACKGROUND OF THE INVENTION

There is known a LCD device including a plurality of sub-pixels in each pixel of the LCD device. Examples of such a LCD device include a transflective LCD device wherein each pixel includes a sub-pixel corresponding to a transmissive area and a sub-pixel corresponding to a reflective area. In the transflective LCD device, if a lateral electric field mode, such as an IPS (in-plane-switching) mode or FFS (fringe-field-switching) mode is adopted, a black-white inversion problem is known, wherein display of a dark state and display of a bright state are reversed between the transmissive area and the reflective area such that the transmissive area assumes a normally black mode and the reflective area assumes a normally white mode, as described in Patent Publication JP-2003-344837A, for example. In a typical longitudinal (vertical alignment) mode, the problem of black-white inversion is optically solved by inserting a λ/4 film. However, in the lateral electric field mode, the technique of inserting the λ/4 film cannot be adopted.

Patent Publication JP-2007-041572A describes a technique for solving the above black-white inversion problem without inserting a λ/4 film. In the technique of this publication, the black-white inversion problem is solved in a specific drive scheme by applying voltages that provide reversed gray-scale levels to the reflective area and the transmissive area. FIG. 15 shows the circuit configuration of a pixel in the LCD device described in JP-2007-041572A. Each pixel 50 includes a first common electrode 53 corresponding to the reflective area 51, second common electrode 54 corresponding to the transmissive area 52, and pixel electrodes 55 and 56 in the reflective area 51 and the transmissive area 52, respectively, to which a common data signal is applied. The liquid crystal (LC) layer in the reflective area 51 is driven by the electric field generated between the pixel electrode 55 and the first common electrode 53, whereas the LC layer in the transmissive area 52 is driven by the electric field generated between the pixel electrode 56 and the second common electrode 54.

In the technique of JP-2007-041572A, the signal applied to the first common electrode 53 and the signal applied to the second common electrode 54 are reversed. For example, when 5V is applied to the pixel electrodes 55 and 56, 0V and 5V are applied to the first common electrode 53 and the second common electrode 54, respectively. In this configuration, 5V is applied to the LC layer in the reflective area 51, whereas 0V is applied to the LC layer in the transmissive area 52. Thus, LC molecules in the LC layer are turned only in the reflective area 51, whereby the problem of black-white inversion is solved.

JP-2007-041572A describes the relationship of potential inversion between the first common-electrode signal and the second common-electrode signal in each pixel; however, the publication is silent to the relationship in the common-electrode signal between adjacent rows of the pixels in the whole display area of the LCD device. In addition, there is no teaching as to the technique for generating the common-electrode signal and as to the electric connection in the display area.

SUMMARY OF THE INVENTION

It is an object of the present invention to provide a LCD device including a plurality of sub-pixels in a pixel of the LCD device wherein the electric connection for the common electrodes have a specific configuration for solving the problem of black-white inversion.

The present invention provides, in a first aspect thereof, a liquid crystal display device including: an array of pixels each including a plurality of sub-pixels; a plurality of pixel electrodes each disposed in corresponding one of the sub-pixels; and a plurality of common electrodes each disposed in a corresponding one of the sub-pixels to oppose a corresponding one of the pixel electrodes, wherein: one of the common electrode disposed in each of the sub-pixels in one of the pixels on each row is connected to others of the common electrodes disposed in corresponding sub-pixels in the others of the pixels arranged on the each row, to form a group of common electrodes connected together.

The present invention provides, in a second aspect thereof, a liquid crystal display device including: an array of pixels each including first and second sub-pixels; first and second pixel electrodes each disposed in the first and second the sub-pixels, respectively; and first and second common electrodes disposed in the first and second sub-pixels, respectively, to oppose the first and second pixel electrodes, respectively, wherein: the first common electrodes in the pixels arranged on an odd-numbered row are connected to the second common electrodes in the pixels arranged on an even-numbered row to form a first group of common electrodes connected together, the second common electrodes in the pixels arranged on the odd-numbered row are connected to the first common electrodes in the pixels arranged on the even-numbered row to form a second group of common electrodes connected together.

The above and other objects, features and advantages of the present invention will be more apparent from the following description, referring to the accompanying drawings.

DETAILED DESCRIPTION OF THE INVENTION

Figure 1:
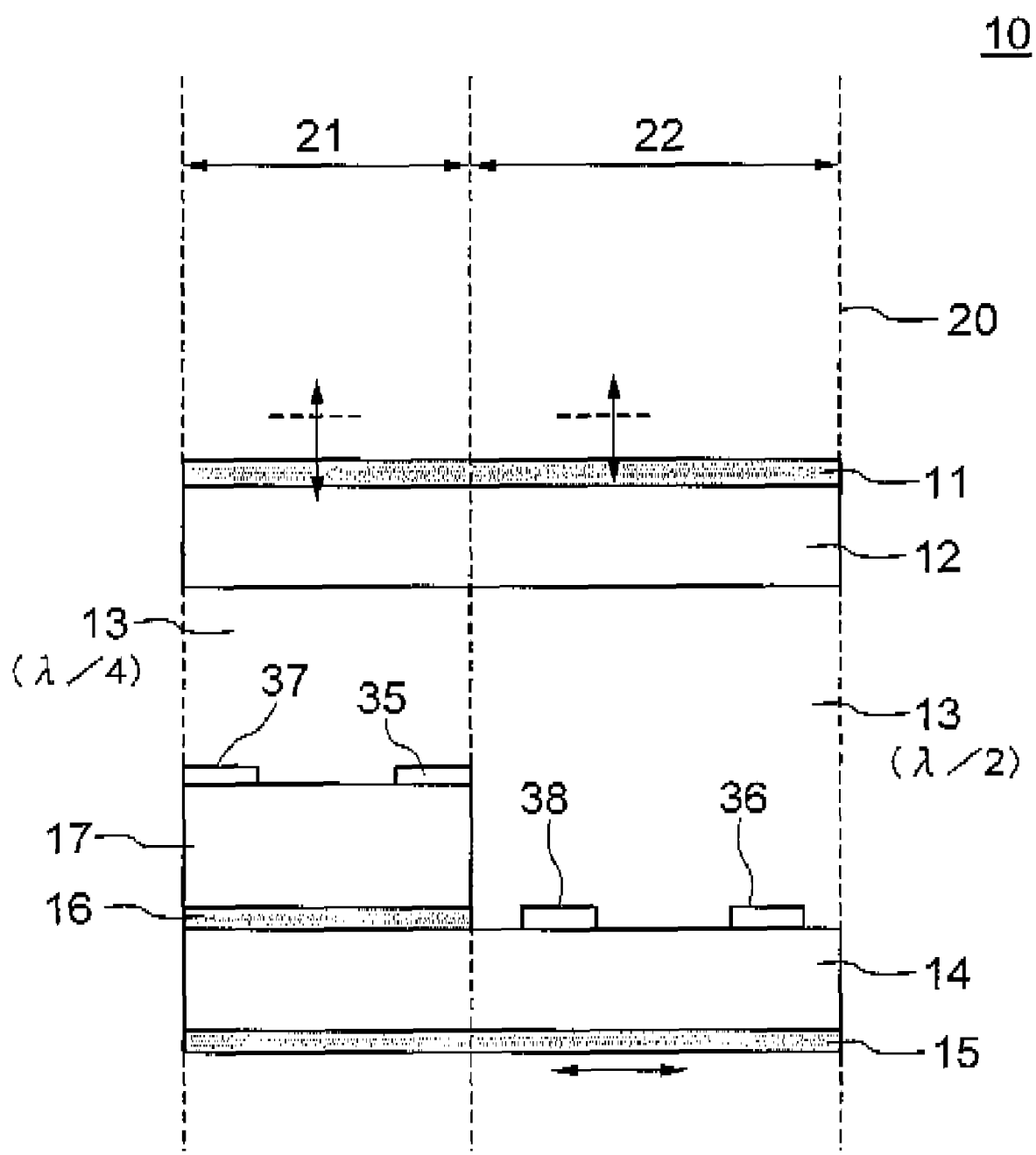
FIG. 1 is a sectional view of a LCD device according to a first embodiment of the present invention.

Before describing exemplary embodiments of the present invention, investigation of LCD devices conducted by the present inventors will be described for a better understanding of the present invention. As described before, there arises a black-white inversion problem in a lateral-electric-field mode transflective LCD device. This problem results from the fact that reflective area assumes a normally white mode, wherein the reflective area represents a bright state (white) upon absence of an applied voltage whereas the reflective area represents a dark state (black) upon presence of the applied voltage, and that the transmissive area assumes a normally black mode, wherein the transmissive area represents a dark state upon absence of the applied voltage whereas the transmissive area represents a bright state upon presence of the applied voltage.

It may be considered that the above black-white inversion problem is solved using different drive voltages to the transmissive area and the transmissive area, wherein the transmissive area is applied with a specific voltage when the reflective area is not applied the specific voltage. The present invention modifies this technique wherein the reflective area is applied with a specific voltage simultaneously with application of another specific voltage to the transmissive area. More specifically, in an example of the present invention, a gate-line-inverting drive scheme is adopted, and a common-electrode signal (COM signal) and an inverted COM signal (~COM signal) are generated. These common-electrode signals are applied to the common electrodes in a pixel disposed in an m-th row and an n-th column, i.e., pixel (m, n), wherein the reflective-area common electrodes, comr(n), and transmissive-area common electrodes, comt(n), are connected in a specific configuration. The present invention is based on a specific circuit configuration of the common electrodes and the technique for generating those common-electrode signals.

Now, exemplary embodiments of the present invention will be described with reference to the accompanying drawings, wherein similar constituent elements are designated by similar reference numerals for a better understanding of the present invention. It should be noted that IPS-mode LCD devices are exemplified as the most of the following embodiments, the present invention can be applied to lateral-electric-filed mode LCD devices including a FES-mode LCD device.

FIG. 1 shows the sectional structure of a transflective LCD according to a first embodiment of the present invention. The LCD device 10 includes a first polarizing film 11, a counter substrate 12 mounting thereon color layers if the LCD device is a color LCD device, an LC layer 13, a TFT (thin-film-transistor) substrate 14 on which an array of pixels each associated with two TFTs are defined, and a second polarizing film 15. The polarization direction (direction of optical transmission axis or optical absorption axis) of the first polarizing film 11 and the polarization direction of the second polarizing film 15 are perpendicular to each other. The LC molecules in the LC layer 13 have a major axis aligned with the polarization direction of the first polarizing film 11 or second polarizing film 15 upon absence of the applied voltage. It is assumed here that the optical transmission axis direction of the first polarizing film 11 is at 90 degrees (upward in the figure), the optical transmission axis direction of the second polarizing film is at 0 degree (left in the figure), the direction of the major axis of the LC molecules is at 90 degrees, and these angles are expressed in terms of a clockwise direction. In FIG. 1, the arrow attached to the polarizing film denotes the optical transmission axis direction of the corresponding polarizing film, In the LCD device 10, a pixel 20 is divided into a plurality (two in this example) of sub-pixels each corresponding to a reflective area 21 or a transmissive area 22. On the TFT substrate 14, there are provided a reflection film 16 and an insulating layer 17 in the reflective area 21. The reflection film 16 reflects the light incident through the first polarizing-film 11. Generally, in order to raise the light dispersion function of the reflection film 16, the surface thereof has convex and concave portions. In the reflective area 21, a pixel electrode 35 receiving a drive signal and a common electrode 36 receiving a reference potential are formed on the insulating layer 17 for driving an LC layer 13. A pixel electrode 36 and a common electrode 38 are also formed in the transmissive area 22 on the TFT substrate 14. The pixel electrodes 35, 36 and common electrodes 37, 38 have a shape of comb teeth as viewed from the above in the figure, and may be referred to as comb-teeth electrodes.

The reflective area 21 uses the light reflected by the reflection film 16 as a light source for display. The LCD device 10 includes a backlight source (not shown) at the rear side of the second polarizing film 15, and the transmissive area 22 uses the backlight as a light source for display. In the transmissive area 22, the gap distance between both the substrates 12, 14 is adjusted so that the retardation of the LC layer 13 assumes around $\lambda/2$. The reason for expressing "around $\lambda/2$" is as follows. When a voltage is applied to the LC layer 13 to turn the major axis of the LC molecules, the LC molecules in the intermediate portion of the cell gap are turned whereas the LC molecules in the LC layer 13 in the vicinity of the substrates 12, 14 are suppressed for the turn. For this reason, the LC layer 13 has physically an actual retardation of $(\lambda/2)+\alpha$ to achieve an effective retardation of $\lambda/2$.

On the other hand, in the reflective area 21, the cell gap is adjusted by controlling the thickness of the insulating film 17 so that the effective retardation of the LC layer 13 assumes $\lambda/4$ upon presence of the voltage applied to the LC layer 13.

Figure 2:
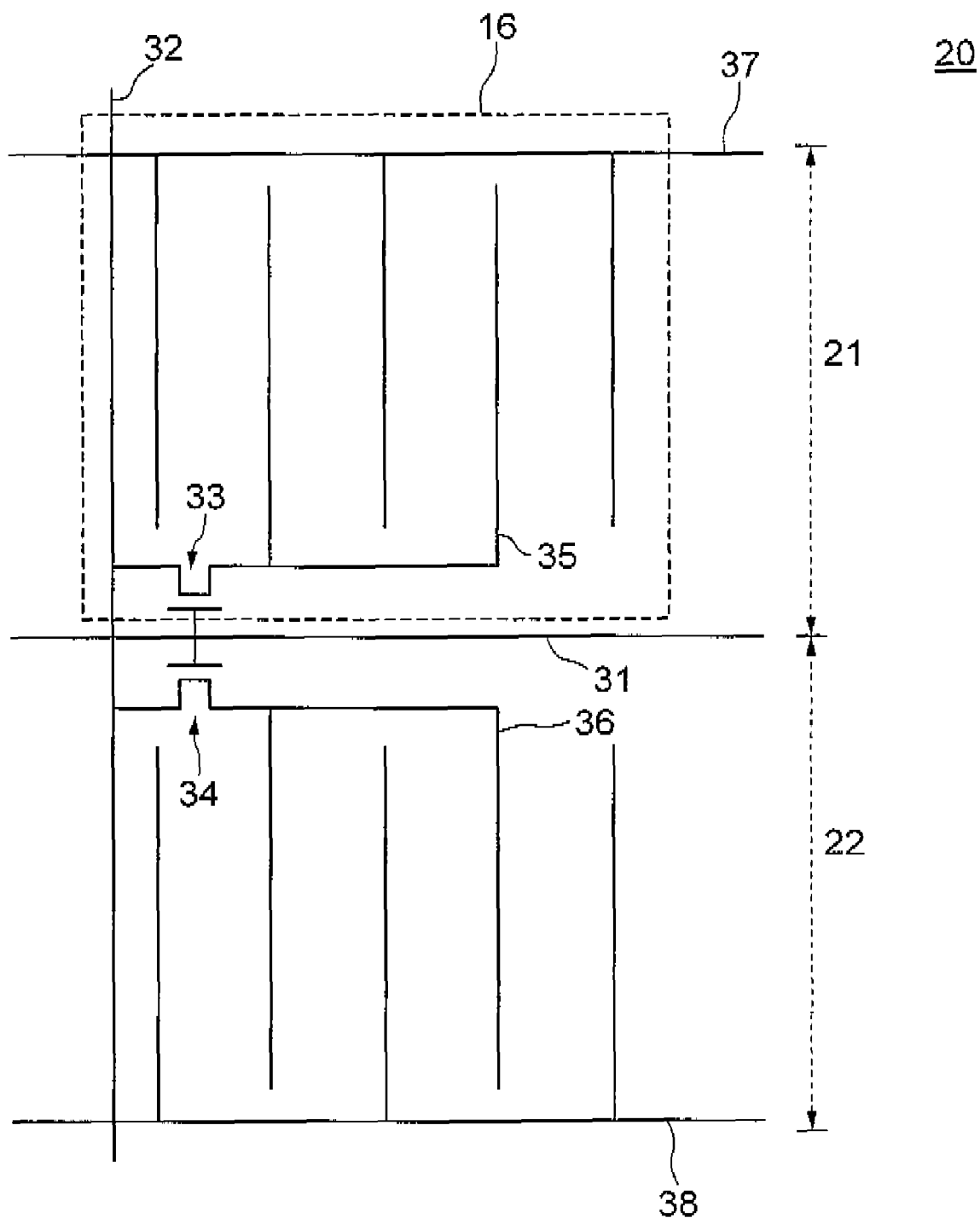
FIG. 2 is a schematic circuit diagram of a pixel in of the LCD device of the first embodiment.
Figure 3:
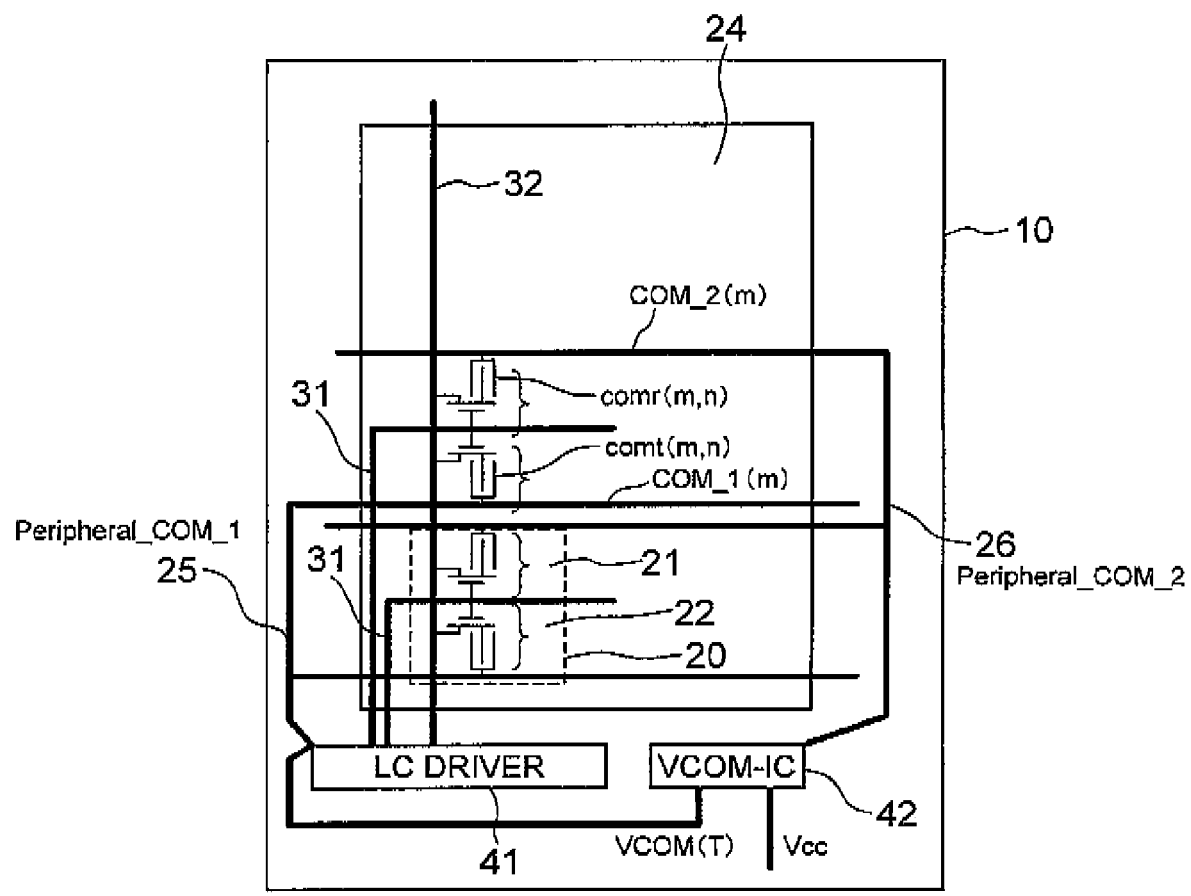
FIG. 3 is a schematic circuit diagram of the LCD device of the first embodiment including a LC driver.

FIG. 2 is a top plan view of the pixel on the TFT substrate in the LCD device of FIG. 1. FIG. 3 shows the schematic circuit configuration of the LCD device 10 including a LC driver for driving the LC layer. On the TFT substrate 14, there are provided a plurality of gate lines 31 extending in the row direction of the display area 24, and a plurality of data lines 32 extending in the column direction. Each pixel 20 is associated with a TFT 33 for the reflective area 21 and a TFT 34 for the transmissive area 22, both the TFTs 33, 34 being located in the vicinity of an intersection of a corresponding gate line 31 and a corresponding data line 32. A first common electrode 37 is provided in the reflective area 21, and a second common electrode 38 is provided in the transmissive area 22.

Now, the drive signal supplied to a pixel (m, n) will be described, the pixel (m, n) being located in the m-th row and the n-th column and including the first common electrode or reflective-area common electrode com(m,n) 37 and the second common electrode or transmissive-area common electrode comt(m,n) 38. Common electrode signal lines include a COM_1(m) line supplying a COM signal to the reflective-area common electrode of the pixels on the m-th row, and a COM_2(m) line supplying an inverted COM signal, or ~COM signal, to the transmissive-area common electrode of the pixels on the m-th row. The COM_1(m) line and COM_2(m) line provided for the pixels on the m-th row are connected to a first peripheral common-electrode signal line (Peripheral_COM_1 line) 25, and a second peripheral common-electrode signal line (Peripheral_COM_2 line) 26, respectively, which extend in the peripheral area of the LCD device 10 outside the display area 24 thereof.

The LC driver 41 generates a gate signal supplied to the gate line 31, a data signal supplied to the data line 32, and a common-electrode signal, COM signal, based on the pixel signal input thereto and a timing signal. The common-electrode signal, COM signal, is delivered to a VCOM-IC 42, which inverts the COM signal to generate an inverted COM signal, or ~COM signal. The COM signal is supplied to the Peripheral_COM_1 line 25, whereas the ~COM signal is supplied to the Peripheral_COM_2 line 26. The data signal is a gate-line inverted signal that is inverted gate line by gate line, whereas the COM signal and ~COM signal are also a gate-line inverted signal that is inverted gate line by gate line.

Figure 4A:
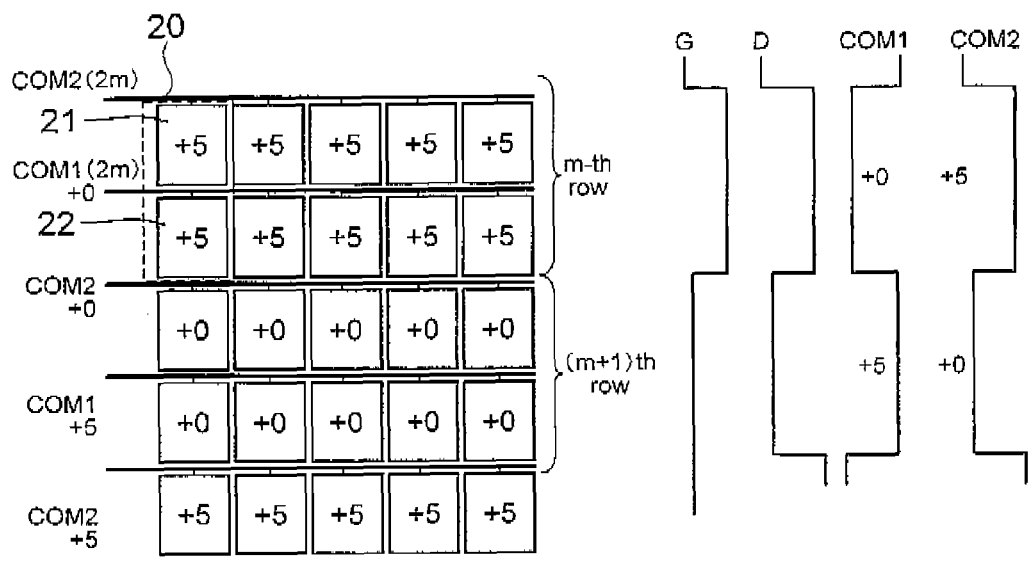
FIGS. 4A and 4B are a schematic operation diagram of the LCD device of the first embodiment.
Figure 4B:
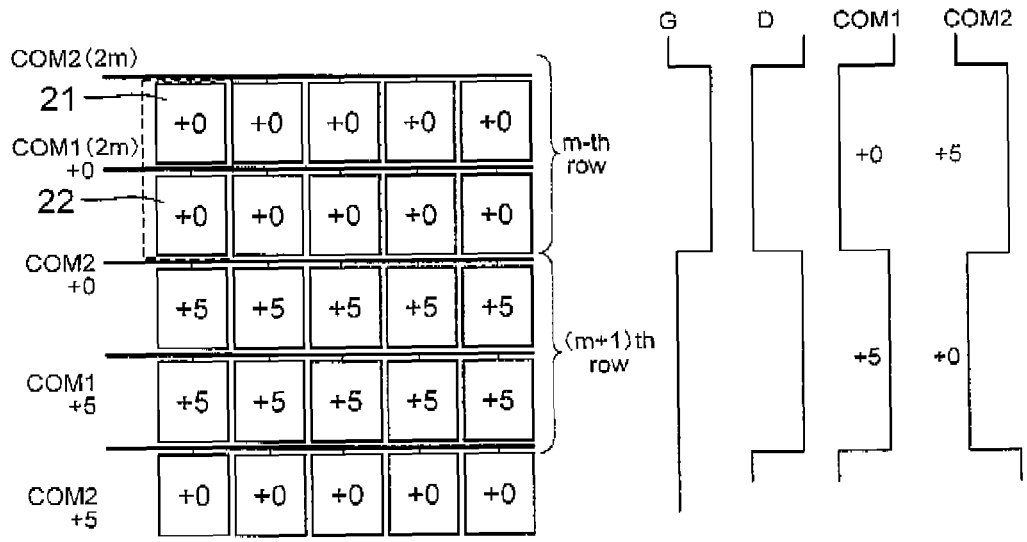

The technique for driving the LC device 10 as a whole will be described for the case where the common-electrode lines are connected a for the array of pixels such that:

COM_1(m) line is connected to comt(m,n), comt(m,n+1), . . . of the pixels on the m-th row: and COM_2(m) lines is connected to comr(m,n), comr(m,n+1), . . . . FIGS. 4A and 4B exemplify the pixel voltage and COM signal in the reflective area and transmissive area of each pixel, upon display of a bright state and a dark state, respectively, in the LCD device 10. The pixel voltage is inverted every row by using a gate-line inversion technique, and COM signal and ~COM signal are also inverted every-row by using a gate-line inversion technique. More specifically, in a single frame of the LCD operation, the COM signal is inverted every row selection period so that potentials 5V, 0V, 5V, 0V, . . . appear in sequence. Similarly, the ~COM signal is inverted every row selection period so that 0V, 5V, 0V, 5V, . . . appear in sequence, assuming an inverted potential of the COM signal.

Upon display of a bright state, as shown in FIG. 4A, the pixel-electrode potential of the reflective area 21 and the transmissive area 22 in the pixels on the m-th row assumes 5V. In this description n is an arbitrary number of the column. The reflective-area common electrode, comr(m,n), of the pixels on the m-th row is connected to the COM electrode line, COM_2(m), which supplies the ~COM signal and assumes 5V upon selection of the m-th line. The transmissive-area common electrode, comt(m,n), of the pixels on the m-th row is connected to the COM_1(m) line, which supplies the COM signal and assumes 0V upon selection of the m-th row. In this case; the LC layer in the reflective area is applied with a voltage equal to |(reflective-area pixel-electrode potential)−(reflective-area common-electrode potential)|=0V, whereas the LC layer in the transmissive area is applied with a voltage equal to |(transmissive-area pixel-electrode potential)−(transmissive-area common-electrode potential)|=5V, whereby both the areas 21, 22 represent a bright state.

On the other hand, upon selection of a (m+1)th row, since the pixel-electrode potential and the common-electrode potential are driven by the gate-line inverting drive scheme, both the reflective-area pixel-electrode potential and transmissive-area pixel-electrode potential are 0V. The reflective-area common electrode, comr(m+1,n), of the reflective area on the (m+1)th row is connected to the COM_2(m+1) line which supplies the ~COM signal and assumes 0V upon selection of the (m+1)th row. The transmissive-area common electrode, comt(m+1,n) of the transmissive area of the pixels on the (m+1)th row is connected to the COM_1(m+1) line, which supplies the COM signal and assumes 5V upon selection of the (m+1)th row. In this case, the LC layer in the reflective area is applied with 0V, whereas the LC layer in the transmissive area is applied with 5V, whereby both the areas represent a bright state. All the rows including the (m+2)th row and subsequent rows operate similarly to the above m-th row or (m+1)th row, whereby all the pixels on the screen represent a bright state.

Upon display of a dark state, as shown in FIG. 4B, the reflective-area pixel-electrode potential and the transmissive-area pixel-electrode potential of the pixels on the m-th row assume 0V. The reflective-area common electrode, comr(m,n), of the pixels on the m-th row is connected to the common-electrode line, COM_2(m), which supplies the ~COM signal and assumes 5V upon selection of the m-th row. The transmissive-area common electrode, comt(m,n), of the pixels on the m-th row is connected to the COM_1(m) line, which supplies the COM signal and assumes 0V upon selection of the m-th row. In this case, the LC layer in the reflective area is applied with a voltage equal to |(reflective-area pixel-electrode potential)−(reflective-area common-electrode potential)|=5V, whereas the LC layer in the transmissive area is applied with a voltage equal to |(transmissive-area pixel-electrode potential)−(transmissive-area common-electrode potential)|=0V, whereby both the areas represent a dark state.

On the other hand, for the pixels connected to the (m+1)th row, since both the pixel-electrode potential and the common-electrode potential are driven by a gate-line inverting drive scheme, the reflective-area pixel-electrode potential and transmissive-area pixel-electrode potential assume 5V. The reflective-area common electrode, comr(m+1,n) of the (m+1)th row is connected to the COM_2(m+1) line, which supplies the ~COM signal and assumes 0V upon selection of (m+1)th row. The transmissive-area common electrode, comt(m+1, n), of pixels on the (m+1)th row is connected to the COM_1(m+1) line, which supplies the COM signal and assumes 5V upon selection of the (m+1)th row. In this case, the LC layer in the reflective area is applied with 5V, whereas the LC layer in the transmissive area is applied with 0V whereby both the areas of the (m+1)th row represent a dark state. Operation of (m+2)th row is similar to that of the m-th row.

Figure 5:
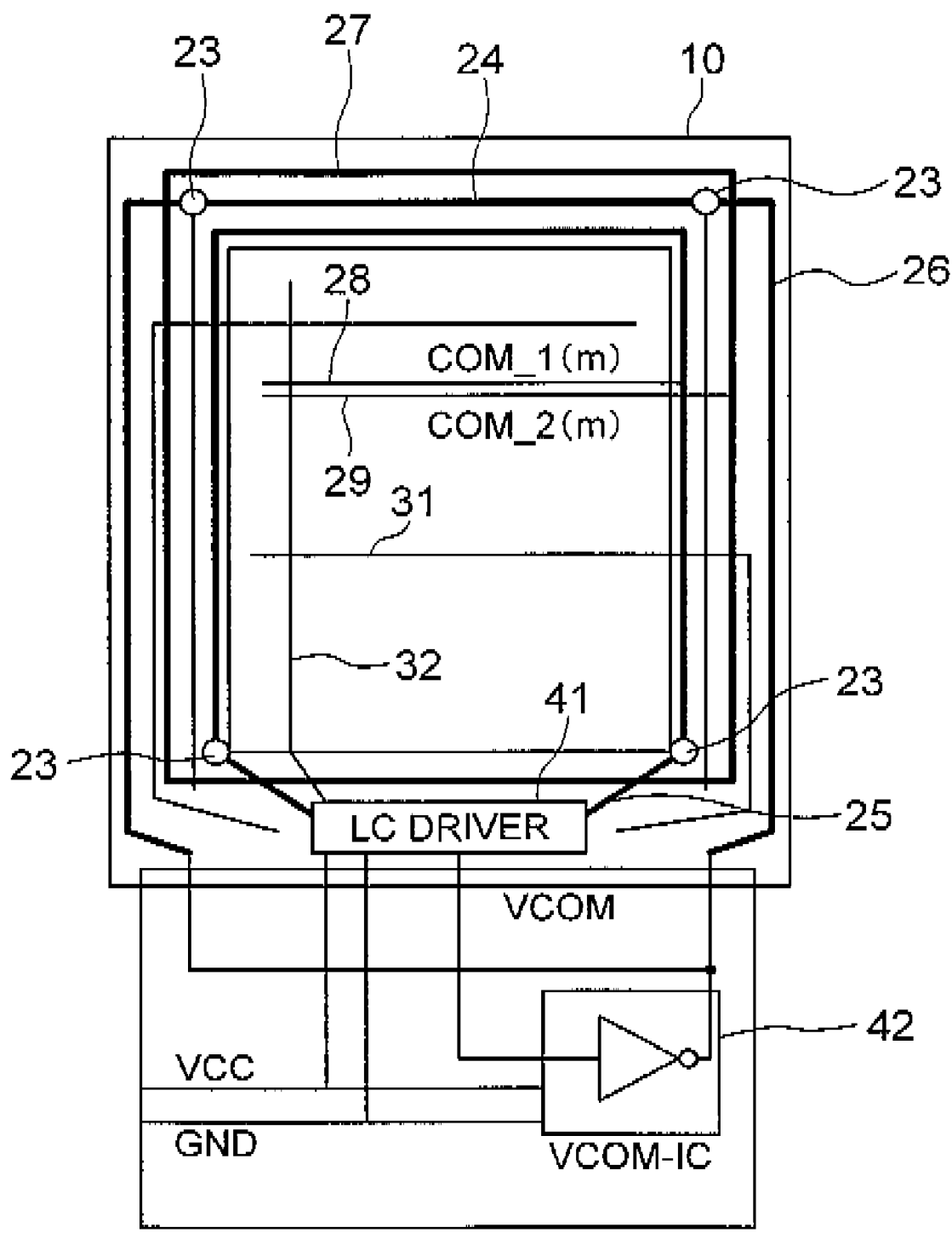
FIG. 5 is a schematic circuit diagram of the common electrodes in the LCD device of the first embodiment.

Detail of the circuit configuration of the common-electrode lines including the Peripheral_COM_1 line 25 and Peripheral_COM_2 line 26 will be exemplified hereinafter. FIG. 5 shows an example of connection for the common-electrode lines in the LCD device 10. The COM signal output from the LC driver 41 is supplied to the Peripheral_COM_1 line 25, which supplies the COM signal for the transmissive area. The COM signal is also input to the inverting amplifier VCOM-IC 42, which generates the ~COM signal and supplies the ~COM signal to the Peripheral_COM_2 line 26. The VCOM-IC 42 raises the signal amplitude of the ~COM signal to increase the drive voltage for the reflective area. The reason for using a higher signal amplitude in the reflective area compared to the transmissive area is that an ON-OFF control of the comb-teeth electrodes of the pixel electrode and common electrode is not performed in the reflective area, and thus for achieving a higher contrast ratio in the transmissive area, a larger distance should be adopted between the pixel electrode and the common electrode in the reflective area, which reduces the electric field per voltage therebetween.

As to the layout configuration of the Peripheral_COM_1 line 25, a plurality of gate lines 31, and the Peripheral_COM_2 line 26, it is preferable that the layout of these lines outside the display area 24 follows in the order of the Peripheral_COM_1 line 25, gate lines 31 and the Peripheral_COM_2 line 26 as viewed from the display area 24 of the LCD device 10. The reason for disposing the Peripheral_COM_1 line. 25 nearest to the display area 24 is that the Peripheral_COM_1 line 25 supplies a signal to the transmissive area, which requires a higher image quality compared to the transmissive area, and thus it is desirable that the Peripheral_COM_1 line 25 have a lower resistance and thus a smaller time constant. The smaller time constant suppresses distortion of the lo signal waveform of the COM signal and also reduces the lateral cross talk.

Detail of the layout of Peripheral COM lines will be described. In general, the LC driver 41 has a pair of COM terminals at both the ends of the LC driver 41 attached to the LCD panel of the LCD device 10 at one side thereof Thus, in the present embodiment, the Peripheral_COM_1 line 25 extends from the COM terminals of the LC driver 41 and configures a loop extending along the three sides of the display area 24. The loop of the Peripheral COM lines lowers the voltage drop of the COM lines and thus suppresses distortion of the signal waveform of the COM signal and ~COM signal applied to the pixels. In the present embodiment, the Peripheral_COM_1 line 25 is formed from a gate (G) layer which is configured to form the gate lines 31, and enters from the LC driver 41 to the display area 24 after crossing a seal member 27 which defines the outer periphery of the display area 24. The seal member 27 is used for sealing the LC layer between the TFT substrate and the counter substrate. After crossing the seal member 27, the Peripheral COM_1 line is connected via through-holes 23 to a data (D) layer which is also configured to form data lines, and extends along the outer periphery of the display area 24 inside the seal member 27. This configuration is adopted because the gate layer is covered by a gate insulation layer and an overcoat layer, whereas the data layer is covered only by the overcoat layer, and thus the gate layer is less likely to be corroded by ingress of water compared to the data layer outside the seal member 27. The gate lines extend from the LC driver 41 and enter the display area 24 after crossing the seal member 27. The gate lines 31 cross the Peripheral_COM_1 line 25 after the Peripheral COM_1 line 25 is configured by the data layer. That is, in this configuration, the Peripheral_COM_1 line 25 can intersect the gate lines 31 at any position within the display area 24.

On the other hand, since the Peripheral_COM_2 line 26 extends from the VCOM_IC 42, the Peripheral_COM_2 line 26 is arranged outside the COM terminals and gate terminals of the LC driver 41. Therefore, the Peripheral_COM_2 line 26 is disposed outside the peripheral gate line as viewed from the display area 24. Since the location outside the gate line 31 means outside the seal member 27, the Peripheral_COM_2 line 26 is configured by the gate layer. The Peripheral_COM_2 line 26 extends to the peripheral position opposite to the LC driver 41, is subjected to G/D conversion at the through-holes and then again extends toward the LC driver 41 as the data layer within the display area 24 inside the seal member 27. The Peripheral_COM_2 line 26 is introduced into the display area 24 after this G/D conversion.

Figure 6:
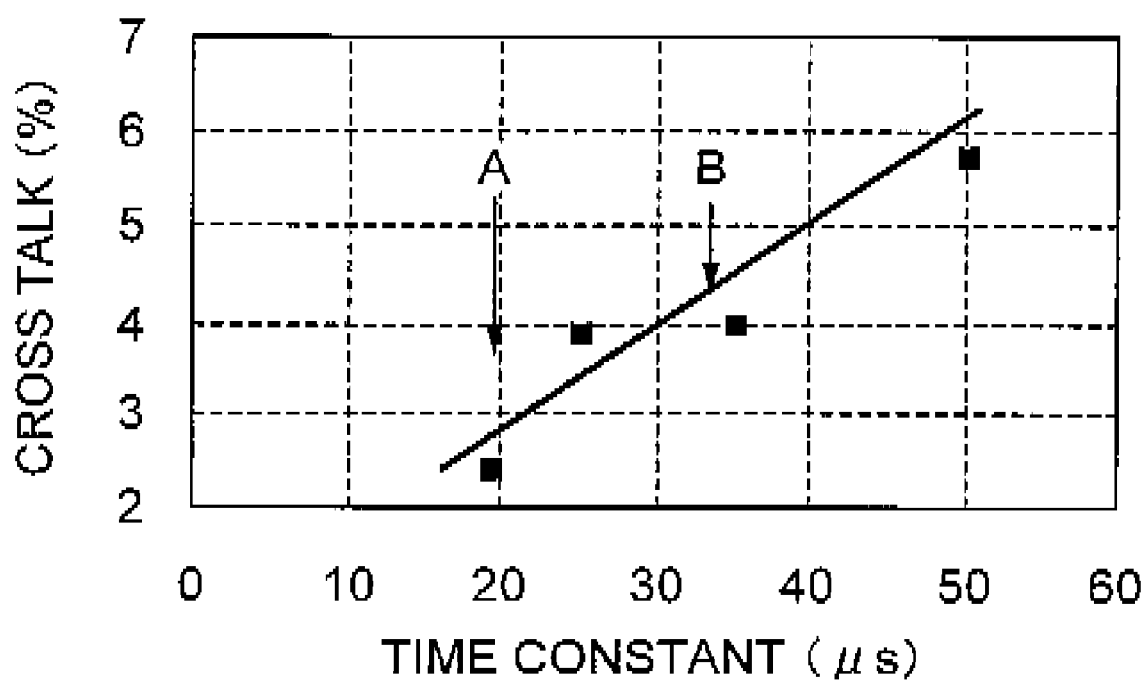
FIG. 6 is a graph showing the relationship between the time constant of the common electrodes and the lateral cross talk.

FIG. 6 shows the relationship between the time constant of COM line and the lateral cross talk. This figure exemplifies a chrome (Cr) metal extending as the Peripheral_COM_1 line 25 on a 3.5" QVGA (240×320) panel. If the Peripheral_COM_1 line 25 extends outside the Peripheral_COM_2 line, the time constant may assume 35 microseconds as indicated by "B" in the graph, which cause a 4%-level cross talk. On the other hand, as shown by "A" in the graph, if the Peripheral_COM_1 line 25 extends inside the Peripheral_COM_2 line, the time constant may assume 20 microseconds, which reduces the cross talk down to a 2% level.

By the way, the reason for using the driver COM output signal as the transmissive-area COM signal and generating the inverted COM signal, ~COM, by using the driver COM signal as an input is as follows. In the case of lateral-electric-field mode, since the gap distance between the reflective area and the transmissive area varies from the location to th location and a compensation film is not used therein, VT (voltage-transmittance) and VR (voltage-reflectance) characteristics of the LCD device do not coincide with each other. Thus, it is determined that the amplitude of the driver output voltage be 5V, and the amplitude of the output voltage of the VCOM-IC 42 be 8V.

Figure 7:
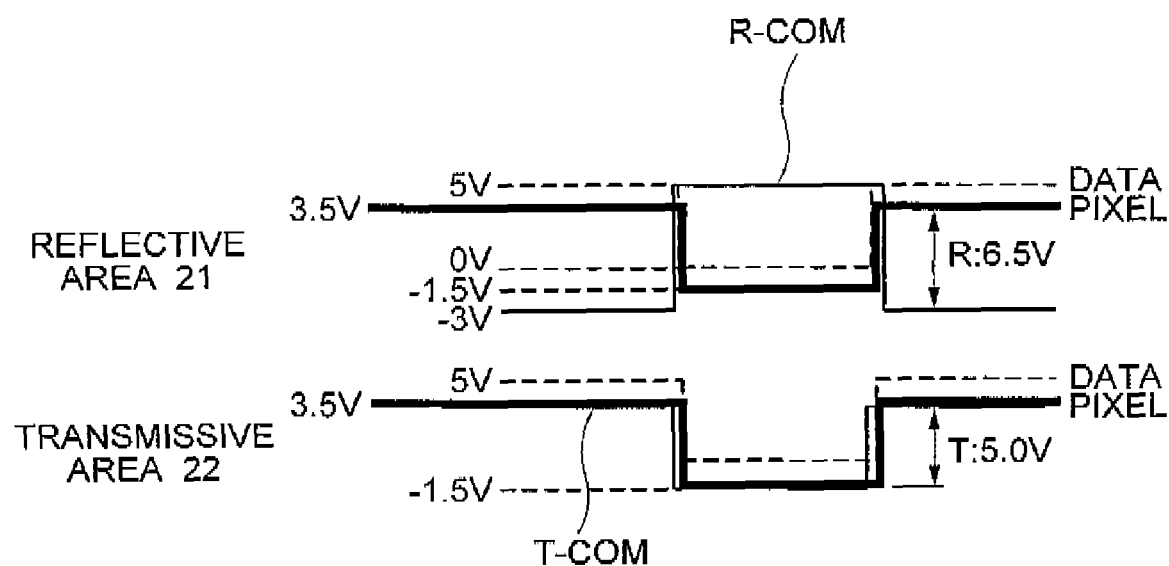
FIG. 7 is a timing chart showing the drive signals.

FIG. 7 shows the drive voltage waveform having an offset voltage in this case. The term "offset voltage" is a deviation of the center value of the amplitude of the voltage with respect to 0V. It is assumed here that the potential of the Peripheral_COM_2 line 26, i.e., the reflective-area common-electrode potential (R-COM potential) is varied within an amplitude of 8V between −3V and 5V. It is also assumed that the potential of the Peripheral_COM_1 line 25, i.e., the transmissive-area common-electrode potential (T-COM potential) is varied within an amplitude of 5V between −1.5V and 3.5V. In this case, the reflective area is driven in an offset drive of (8−5) V/2=1.5V. By using this configuration, the VT characteristic of the reflective area (inverted VR characteristic) and the VT characteristic of the transmissive area can be adjusted to have an offset voltage.

The VCOM-IC 42 eliminates the DC component of the transmissive-area COM signal by using a capacitor, then inverts the same, and amplifies in voltage if needed. The VCOM-IC 42 is configured so that the center value of the inverted COM signal may be adjusted in an offset control circuit. In general, if the center value of the transmissive-area and reflective-area COM signals is deviated from a flicker minimum voltage, a flicker is generated. In addition, the flicker minimum value is generally different between the reflective area and the transmissive area depending on the way of TFT leakage current and the storage capacitance of the reflective/transmissive area. By inputting the transmissive-area COM signal after eliminating the DC component thereof, and adjusting the center value of the inverted COM signal in an off adjusting circuit, it is possible to suppress the flicker in both the reflective area and transmissive area. The suppression of the flicker eliminates the DC component from the LC, thereby achieving a transflective LCD having a higher resistance against both burning and stain.

In the description of the present embodiment, the technique for supplying the common-electrode signal to the reflective area and transmissive area of the pixels arranged in a plurality of rows is detailed. This technique achieves an effective drive of a lateral-electric-field-mode transflective LCD device. In addition, use of the COM signal output from the LC driver as the transmissive-area common-electrode signal, and generation of the amplified inverted common-electrode signal, ~COM, from the COM signal provides an effective technique for allowing coincidence of the VT characteristic between the reflective area and the transmissive area, and eliminating the factor impeding a display quality, such as cross talk or flicker. Further, by optimizing the extension of the two COM lines in the peripheral area, the transmissive LCD device has an improved image quality substantially without incurring a cross talk.

Figure 8:
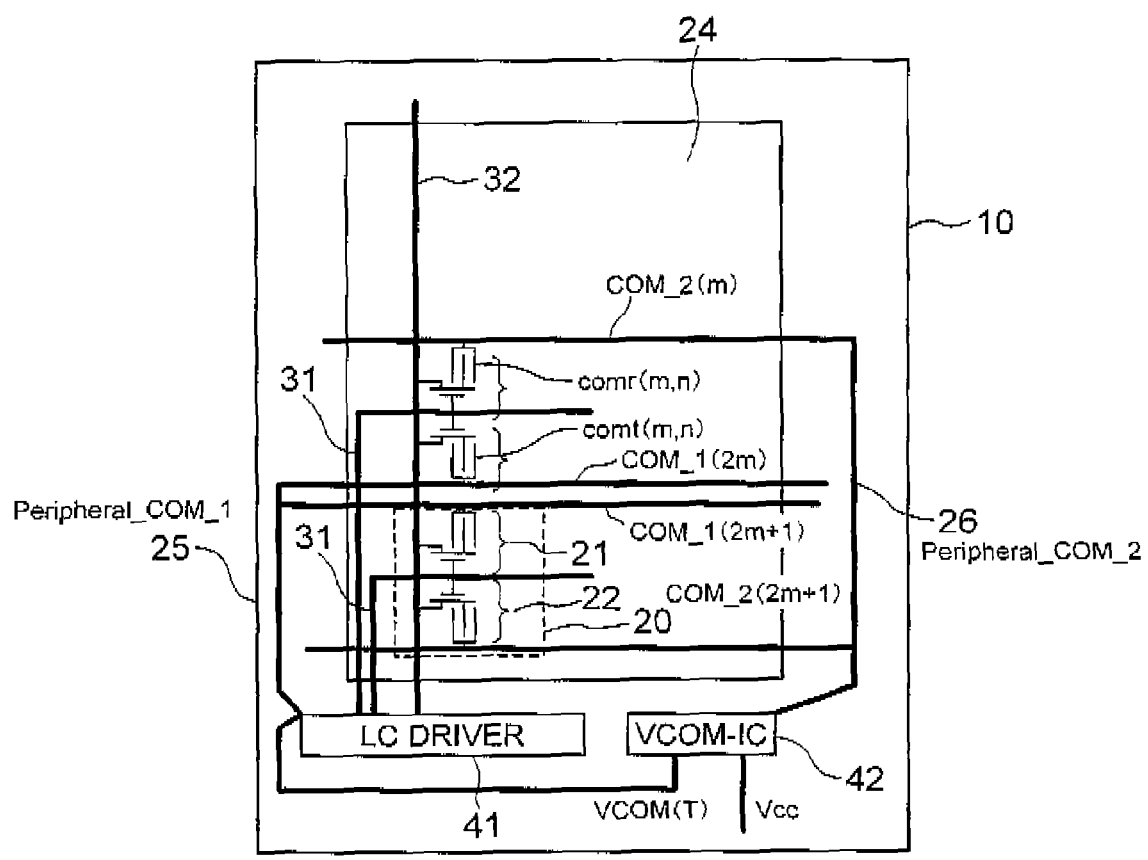
FIG. 8 is a schematic circuit diagram of a LCD device according to a second embodiment of the present invention.

A second embodiment of the present invention will be described hereinafter. The sectional view and optical arrangement of the LCD device are similar to those of the first embodiment, and are omitted for description and depiction thereof FIG. 8 shows a sectional view of the LCD device of the present embodiment including a driver for driving the LC. The TFT substrate 14 mounts thereon a plurality of gate lines 31 extending in a row direction, a plurality of data lines 32 extending in a column direction, and an array of pair of TFTs disposed in the vicinity of an intersection of a gate line and a data line. The pair of TFTs are disposed for a single pixel, and include a first TFT 33 for a reflective area and a second TFT 34 for a transmissive area. The TFTs 33, 34 are connected to the reflective-area pixel electrode and transmissive-area pixel electrode, respectively. The reflective area 21 includes a first common electrode, and the transmissive area 22 includes a second common electrode.

A pixel (m,n) located on a m-th row and n-th column includes a reflective-area common electrode, comr(m,n), and a transmissive-area common electrode, comt(m,n). A COM_1(*m*) line extends on the m-th row for supplying the common-electrode signal, COM, to the reflective area, and a COM_2(*m*) line extends on the m-th row for supplying the inverted common-electrode signal, ~COM, to the transmissive area. The COM_1(2m) line is connected to the transmissive-area common electrodes comt(2m,n), comt(2m,n+1), . . . on the 2m-th row, whereas a COM_2(2m+1) line is connected to the transmissive-area common electrodes comt(2m+1,n), comt(2m+1,n), . . . on the (2m+1)th row. The COM_2(2m) line is connected to the reflective-area common electrodes comr(2m,n), comr(2m,n+1), . . . , whereas the COM_1(2m+1) line is connected to the reflective-area common electrodes comt(2m+1,n), comt(2m+1,n+1), . . . . In short, the pixels on the even-numbered row has a connection configuration opposite to the connection configuration of the pixels on the odd-numbered row as to the relationship between the COM_1 and COM_2 lines.

Figure 9:
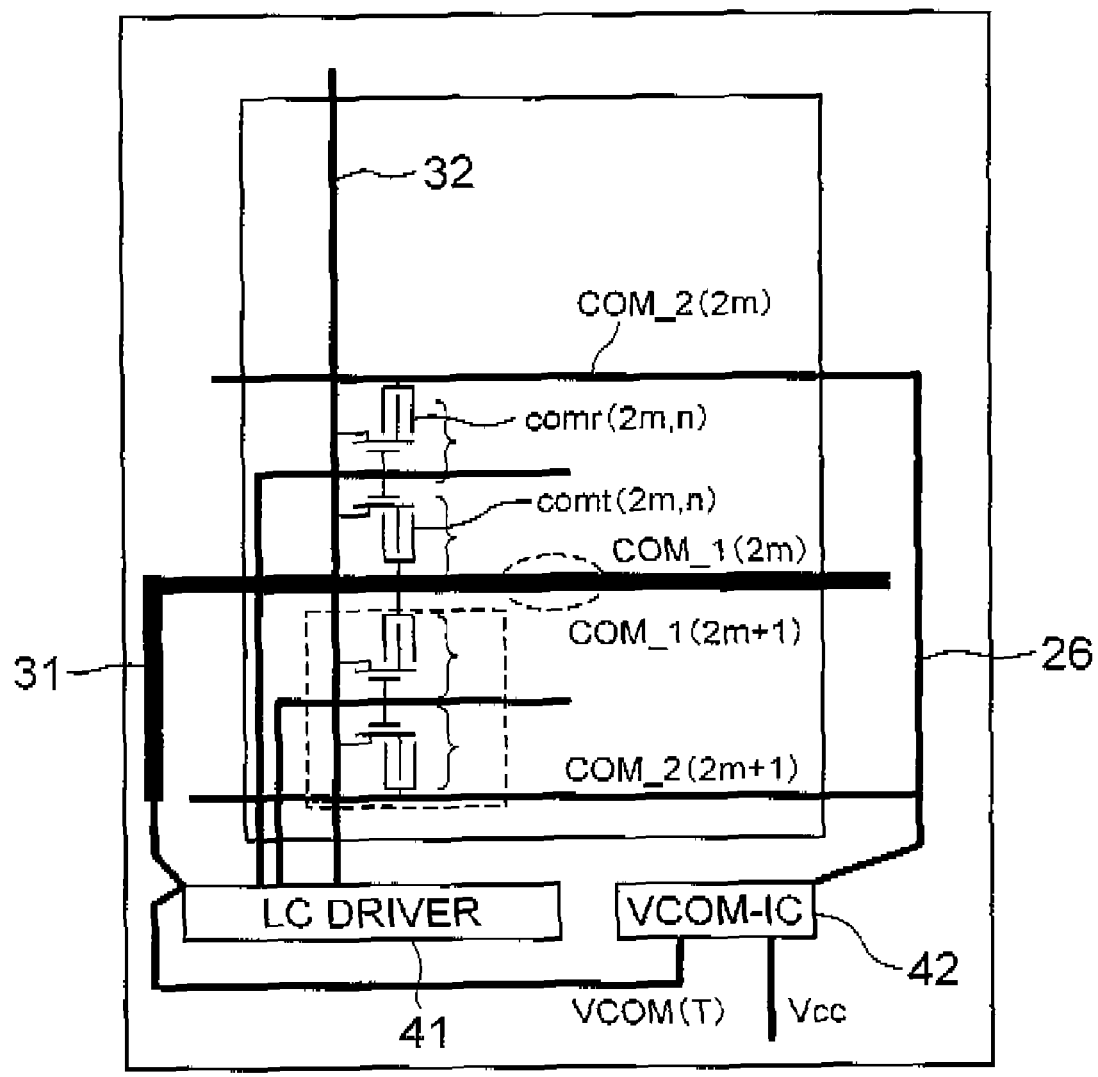
FIG. 9 is a schematic circuit diagram of a LCD device according to a modification of the second embodiment.

The LC driver 41 generates a gate signal supplied to the gate lines 31, a data signal supplied to the data line 32, and a common-electrode signal, COM signal, supplied to the common electrodes, based on the input pixel signal and a timing signal. The VCOM-IC 42 receives the common-electrode signal, COM, and generates therefrom an inverted COM signal. Although COM_1(2m+1) and COM_1(2m) signals are separately generated in FIG. 8, the COM_1(2m+1) signal is the same as the COM_1(2m) signal, and thus the signal lines for these signals may be integrated, as shown in FIG. 9. That is, the transmissive-area common-electrode signal, COM1 (2m), for the pixels on the 2m-th row is the same as the reflective-area common-electrode signal, COM_1(2m+1), for the pixels on the adjacent (2m+1)th row.

Figure 10A:
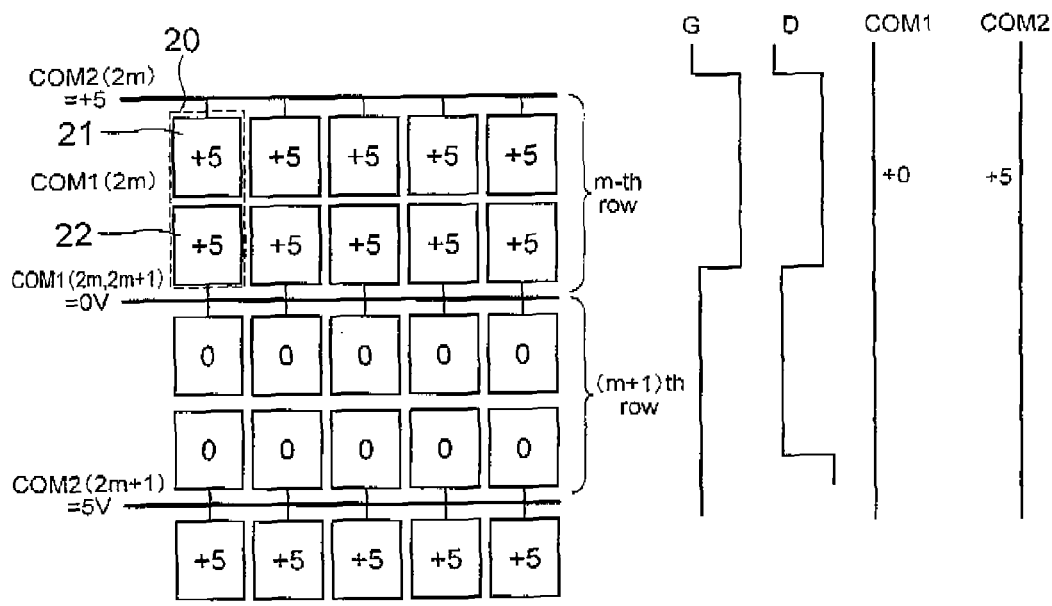
FIGS. 10A and 10b are schematic operation diagram of the LCD device of the second embodiment.
Figure 10B:
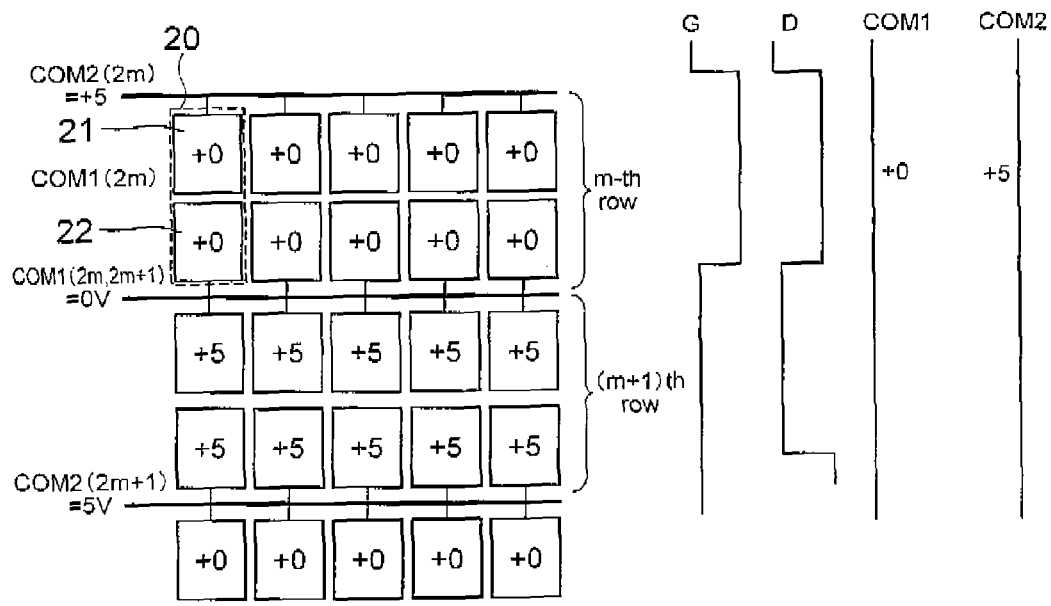

FIGS. 10A and 10B are an operation diagram showing the drive voltage for the pixels upon display of a bright state and a dark state, respectively, associated with a waveform signal of the pixel signals and the COM signals. The LCD device uses a gate-line inverting drive scheme for the pixel signals, whereas the LCD device uses a frame inverting drive scheme for the COM signal and ~COM signal pixel. More specifically, in a frame, COM1 signal is constant at 5V, and COM2 signal is constant at 0V. Since COM1(2m) signal and COM1 (2m+1) signal have the same potential, the signal lines for supplying COM_1(2m) and COM_1(2m+1) signals are shown as an integrated line in FIG. 10.

Upon display of a bright state, as shown in FIG. 10A, the reflective-area pixel-electrode potential and the transmissive-area pixel-electrode potential on the 2m-th row are at 5V The common electrode, comr(2m,n) of the reflective-area of the pixels on the 2m-th row is connected to the common-electrode line, COM_2(2m), which receives inverted COM signal and assumes 5V upon selection of the 2m-th row. On the other hand, the transmissive-area common electrode, comt(2m,n), of the pixels on the 2m-th row is connected to the COM_1 (2m) line, which receives the COM signal and assumes 0V upon selection of the 2m-th row. Thus, the LC layer in the reflective area is applied with 0V, whereas the LC layer in the transmissive area is applied with 5V, whereby LC layer in both the areas represents a bright state.

The reflective-area pixel-electrode potential and the transmissive-area pixel-electrode potential on the (2m+1)th row assume 0V, due to the gate-line inverting drive scheme. The reflective-area common electrode, comr(2m+1,n), of the pixels on the (2m+1)th row is connected to the COM_1 (2m+1) line, which receives the COM signal and assumes 0V due to the frame inverting drive scheme. The transmissive-area common electrode of the pixels on the (2m+1)th row is connected the COM_2(2m+1) line, which receives the inverted COM signal, ~COM signal, and assumes 5V upon selection of the (2m+1)th row. Thus, the LC layer in the reflective area is applied with 0V, and the LC layer in the transmissive area is applied with 5V, whereby the LC layer in both the areas represent a bright state. The COM signals of the pixels on the (2m+2)-th row is similar to the COM signals of the pixels on the 2m-th row.

Upon display of a dark state, as shown in FIG. 10B, the reflective-area pixel-electrode potential and transmissive-area pixel-electrode potential on the m-th row is 0V. The reflective-area common electrode, comr(2m,n), is connected to the common-electrode line, COM_2 (2m), of the 2m-th row, which receives the inverted COM signal, ~COM, and assumes 5V upon selection of the 2m-th row. The transmissive-area common electrode, comt(2m,n), of the pixels on the 2m-th row is connected to COM_1(2m) line, which receives the COM signal and assumes 0V upon selection of the 2m-th row. Therefore, the LC layer in the reflective area is applied with 5V, and the LC layer in the transmissive area is applied with 0V, whereby the LC layer in the reflective area and transmissive area represents a dark state.

The reflective-area pixel-electrode potential and transmissive-area pixel-electrode potential of the pixels on the (2m+1)th row is 5V due to the gate-line inverting drive scheme. The reflective-area common electrode, comr(2m+1,n) of the pixels on the (2m+1)th row is connected to the COM_1(2m+1) line, which receives the COM signal and assumes 0V upon selection of the (2m+1)th row due to the frame inverting drive scheme. The transmissive-area pixel electrode of the pixels on the (2m+1)th row is connected to the COM_2(2m+1) line, which receives the inverted COM signal, ~COM, and assumes 5V upon selection of the (2m+1)th row. Therefore, the LC layer in the reflective area is applied with 5V, and the LC layer in the transmissive area is applied with 0V, whereby the LC layer in the reflective area and transmissive area represents a dark state. The subsequent (2m+2)th row is similar to the 2m-th row.

In the present embodiment, the COM signal driven by the frame inverting drive scheme reduces the power dissipation. In addition, as shown in FIG. 9, the reflective-area common-electrode line of the pixels on the 2m-th row can be integrated with the transmissive-area common-electrode line of the pixels on the (2m+1)th row, to thereby increase the aperture ratio of the LCD device, which is defined by an effective display area to the total display area.

Figure 11A:
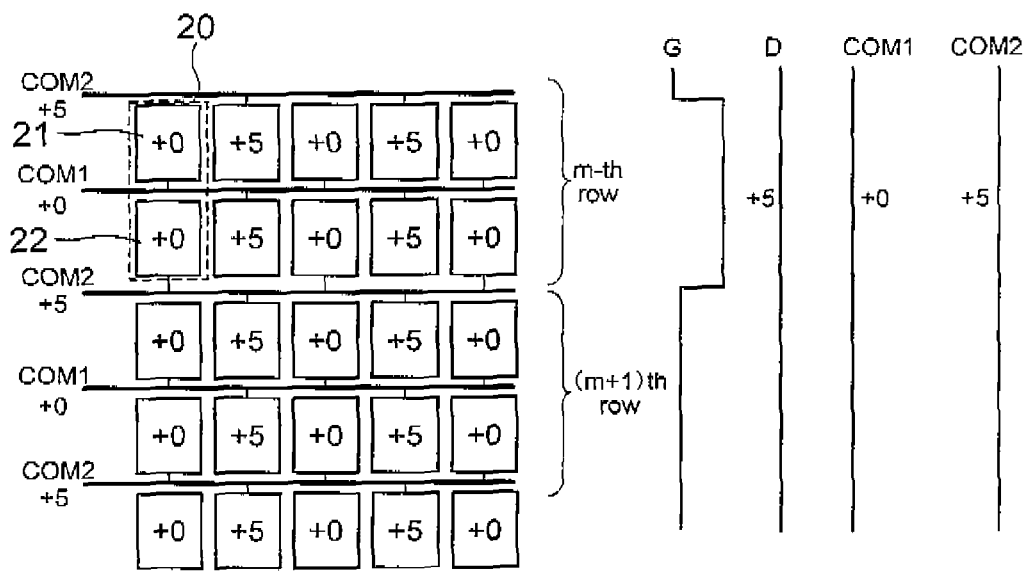
FIGS. 11A and 11B are schematic operation diagram of a LCD device according to a third embodiment of the present invention.
Figure 11B:
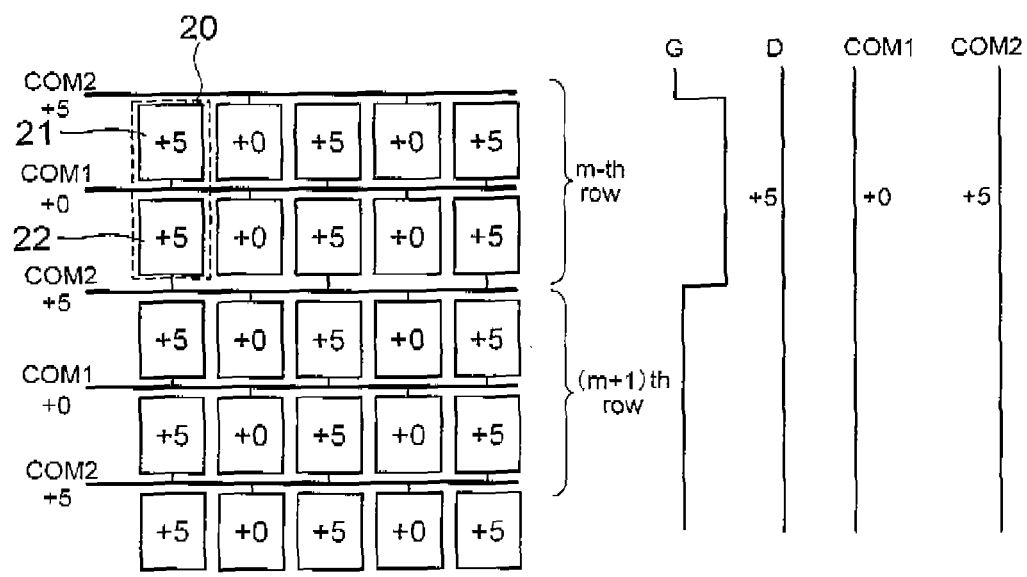

The method of driving the LC layer is not limited to the above embodiments. For example, the COM potential and inverted COM potential may be driven in a frame inverting drive scheme, whereas the pixel-electrode potential is driven in the frame inverting drive scheme. FIGS. 11A and 11B show a bright state and a dark state, respectively, in which both the pixel-electrode potential and the COM potential are driven by a frame inverting drive scheme. This configuration further reduces the power dissipation.

In the above embodiments, each pixel includes a reflective area corresponding to a first sub-pixel, and a transmissive area corresponding to a second sub-pixel; however, each pixel in the LCD device of the present invention may include two or more sub-pixels. In such a case the term "odd-numbered row" and "even-numbered row" may be replaced by m-th row, (m+1)th row and (m+2)th row where m is an integer equal to or more than zero.

Figure 12:
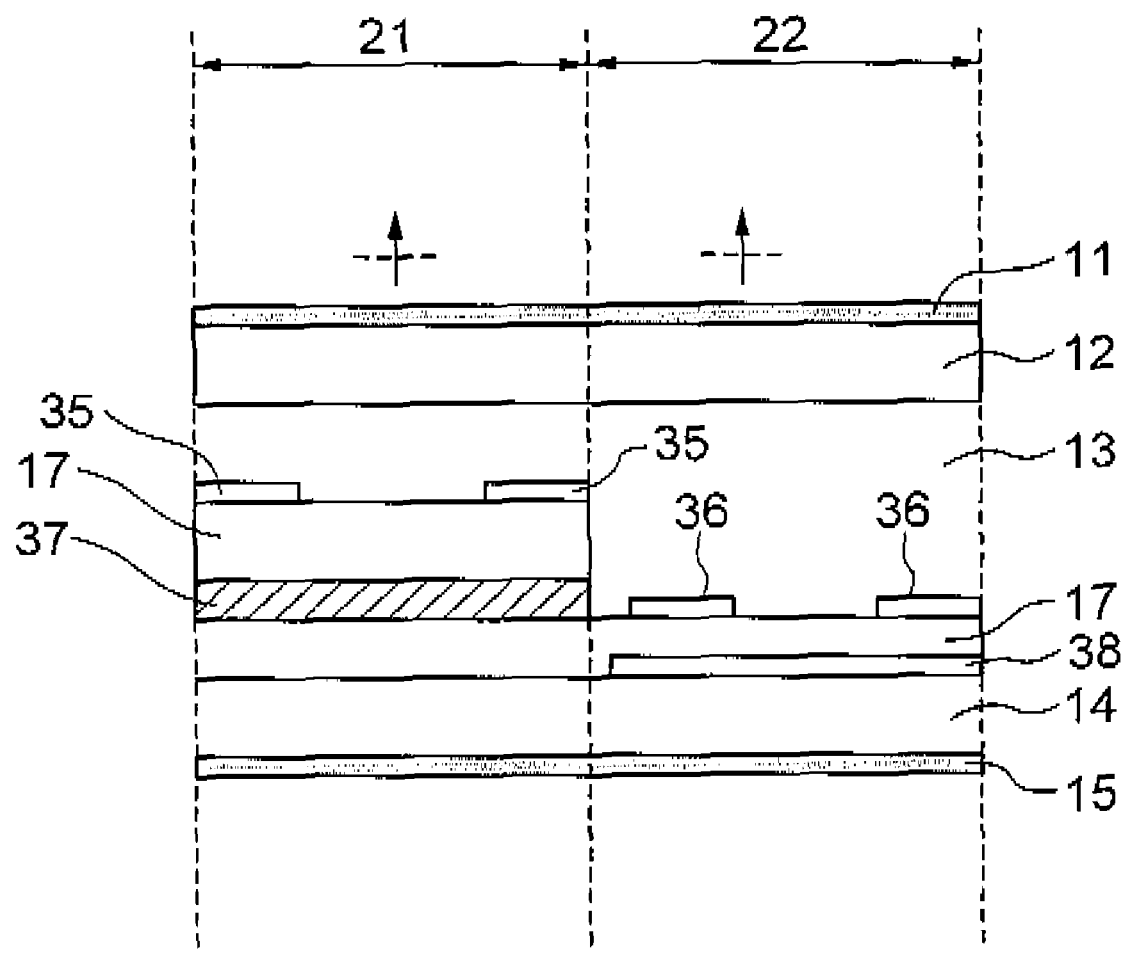
FIG. 12 is a sectional view of a LCD device according to a modification of the embodiment.

FIG. 12 is sectional view of a LCD device according to a modification of the first embodiment. This modification is an example of the FFS-mode LCD device to which the first embodiment of the present invention is applied. In both the reflective area 21 and transmissive area 22, the common electrode 35, 36 are formed on the TFT substrate 14, and are isolated from each other by an intervening insulation film 17. Electric field for the LC layer 13 is generated between the fringe of the pixel electrode 35, 36 and the common electrode 37, 38. The first common electrode 37 functions as a reflector in the reflection area 21.

Figure 13:
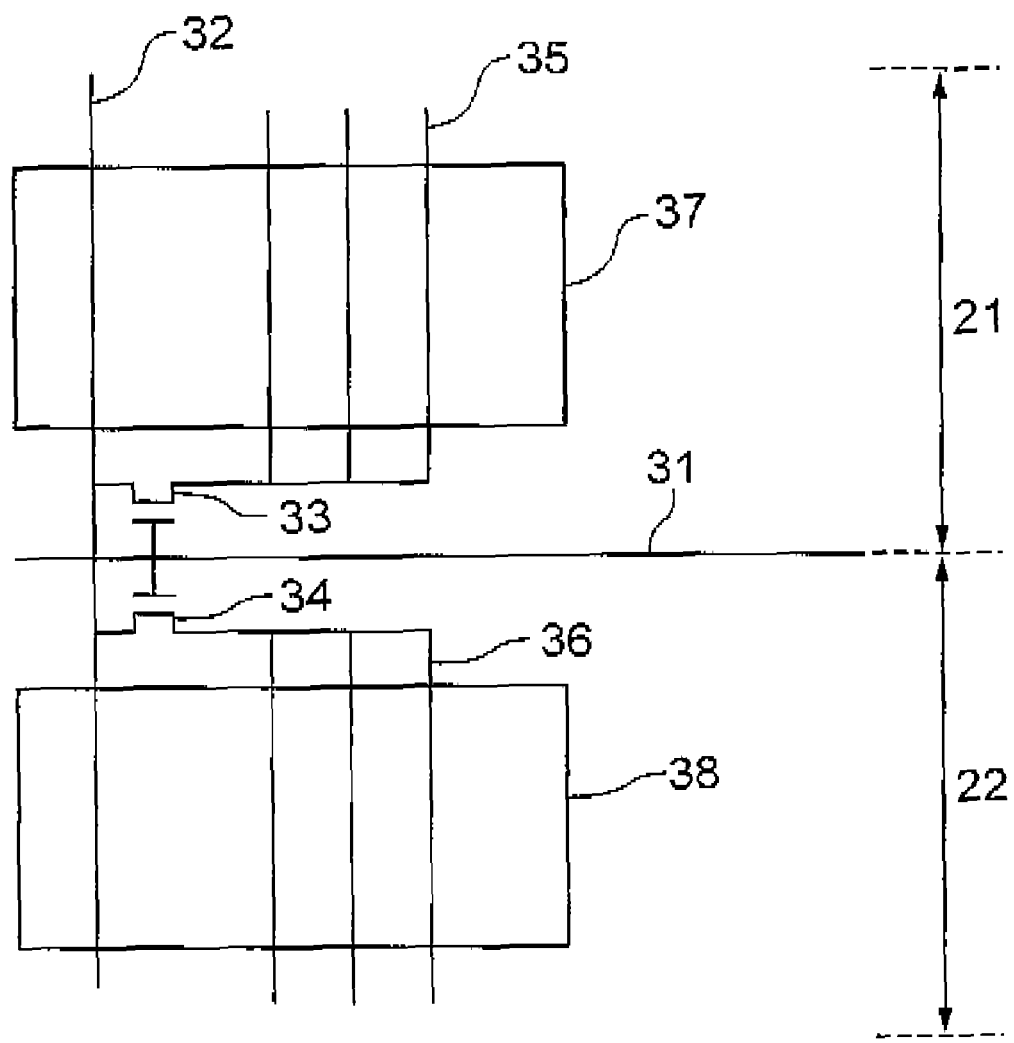
FIG. 13 is a schematic circuit diagram of a pixel in of the LCD device of FIG. 12.

FIG. 13 is a schematic circuit diagram of a pixel in of the LCD device of FIG. 12. FIG. 13 corresponds to FIG. 2 showing the circuit configuration of the pixel in the LCD device of the first embodiment. Both the first and second pixel electrodes 35, 36 are configured as a comb-shaped electrode, whereas the first and second common electrodes 37, 38 are of a flat shape. Other configurations of the LCD device of the modification are similar to those of the LCD device of the first embodiment.

Figure 14:
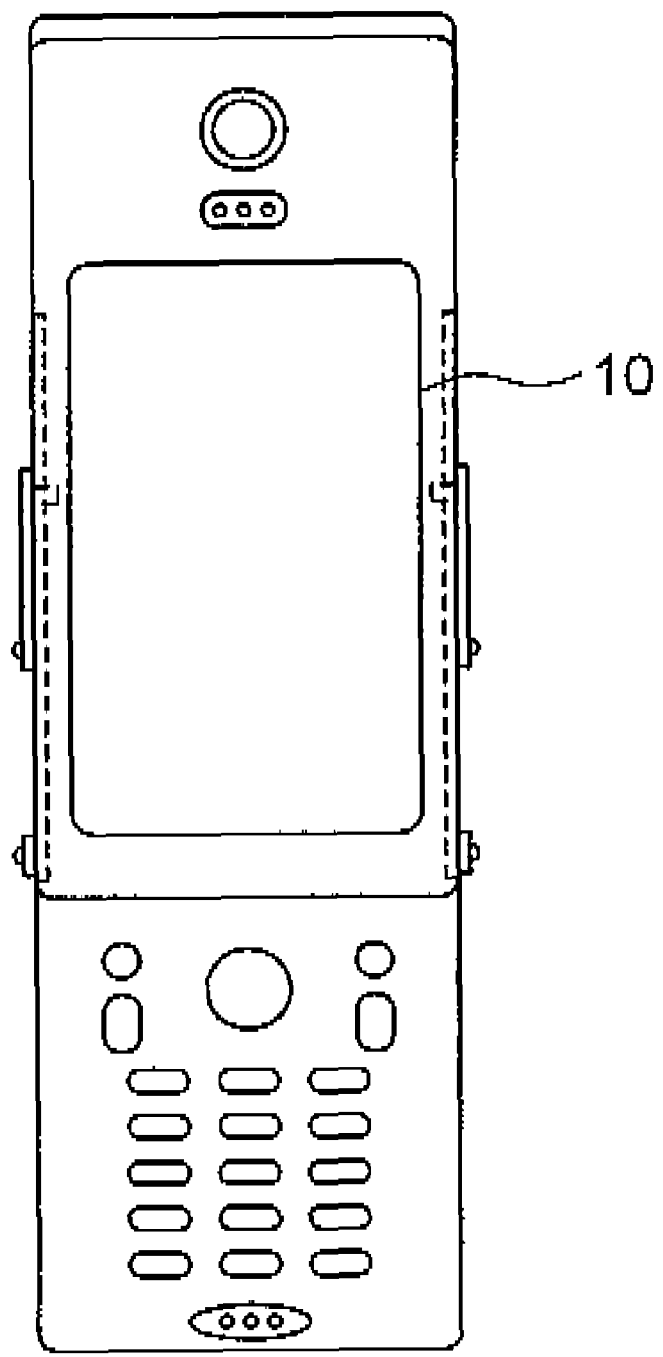
FIG. 14 is front view of a portable terminal including a LCD device according to an example of the present invention.
Figure 15:
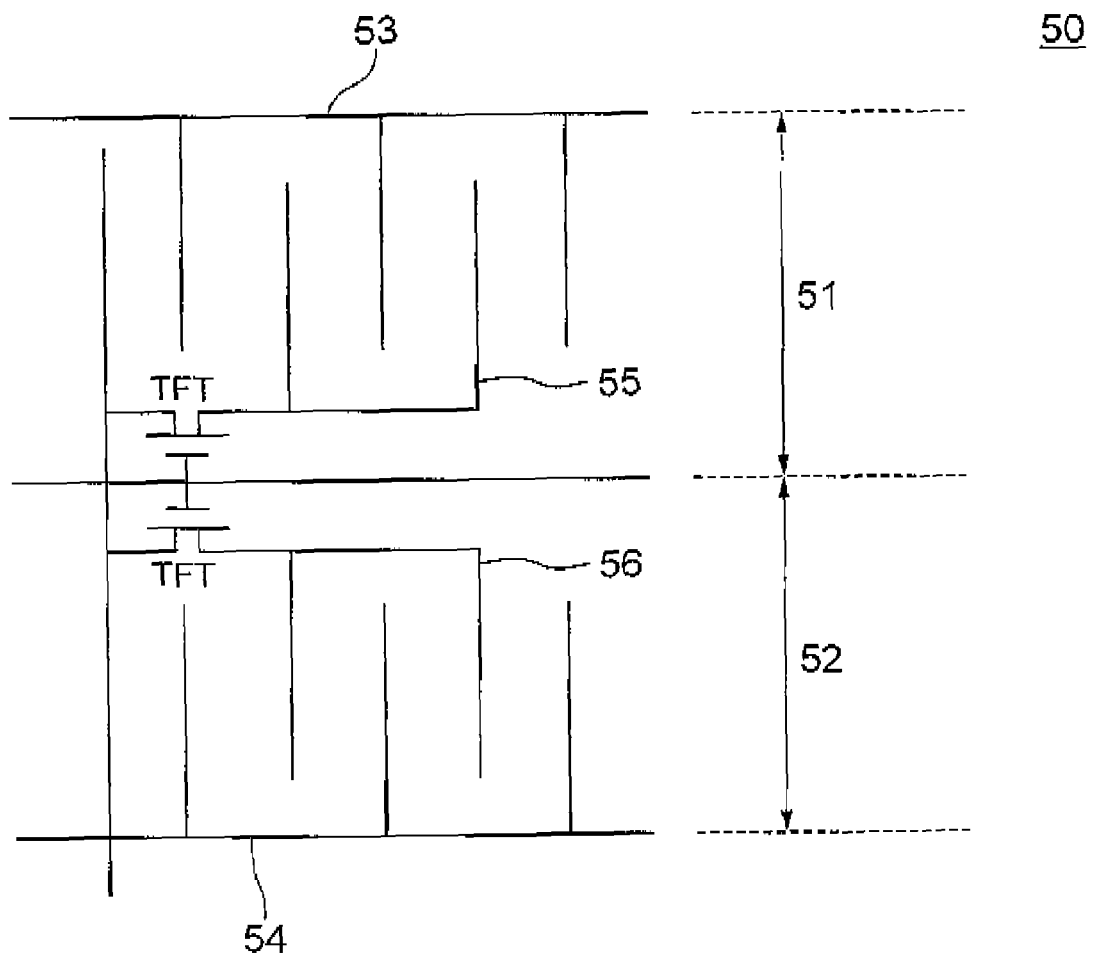
FIG. 15 is a schematic circuit diagram of a LCD device described in a patent publication.

FIG. 14 shows a front view of a portable terminal including a LCD device according to an example of the present invention. The portable device 60 includes the LCD device 10 as a display unit for the portable device. Other constituent elements of the portable device 10 are configured by typical devices, and thus are omitted for detailed description.

While the invention has been particularly shown and described with reference to exemplary embodiment and modifications thereof, the invention is not limited to these embodiment and modifications. It will be understood by those of ordinary skill in the art that various changes in form and details may be made therein without departing from the spirit and scope of the present invention as defined in the claims.

What is claimed is:

1. A liquid crystal display device comprising:
an array of pixels each including a plurality of sub-pixels;
a plurality of pixel electrodes each disposed in a corresponding one of said sub-pixels; and
a plurality of common electrodes each disposed in a corresponding one of said sub-pixels to oppose a corresponding one of said pixel electrodes, wherein:
one of said common electrodes disposed in each of the sub-pixels in one of said pixels on each row is connected to others of said common electrodes disposed in corresponding sub-pixels in the others of said pixels arranged on said each row, to form a group of common electrodes connected together and wherein said pixels each include a transmissive area,
said liquid crystal display device further comprises a first peripheral common-electrode line connecting together corresponding common-electrode lines each connected to said group of common electrodes corresponding to said transmissive area,
wherein said first peripheral common-electrode line includes a first portion configured by a gate line and disposed outside of a seal member which encapsulates a liquid crystal layer in said liquid crystal display device, and a second portion configured by a data line and disposed inside of said seal member.

2. The liquid crystal display device according to claim 1, wherein said group of common electrodes is connected to a corresponding common-electrode line extending adjacent to said each row.

3. The liquid crystal display device according to claim 1, wherein said common-electrode line connected to said group of common electrodes in said each row is connected to corresponding common-electrode lines connected to a corresponding group of common electrodes in other rows via a corresponding peripheral common-electrode line at an end of said common-electrode line.

4. The liquid crystal display device according to claim 1, wherein said sub-pixels in each of said pixels include at least a first sub-pixel and a second sub-pixel.

5. The liquid crystal display device according to claim 4, wherein said pixels each include a reflective area and a transmissive area, said first sub-pixel corresponds to said reflective area and said second sub-pixel corresponds to said transmissive area.

6. The liquid crystal display device according to claim 5, wherein a first peripheral common-electrode line is disposed inside of a second peripheral common-electrode line connecting together corresponding common-electrode lines connected to said group of common electrodes corresponding to said reflective area.

7. The liquid crystal display device according to claim 6, wherein a gate signal line extends between said first peripheral common-electrode line and said second peripheral common-electrode line.

8. The liquid crystal display device according to claim 6, wherein a first common-electrode signal is supplied via a gate line inversion drive to a first common electrode group, and a second common-electrode signal is supplied via a gate line drive to a second common electrode group.

9. The liquid crystal display device according to claim 6, wherein one of a first common-electrode signal applied to said first peripheral common-electrode line and a second common-electrode signal applied to said second peripheral common-electrode line is obtained by inverting the other of said first and second common-electrode signals.

10. The liquid crystal display device according to claim 8, wherein one of said first and second common-electrode signals has a center value of a signal amplitude which is different from a center value of a signal amplitude of the other of said first and second common-electrode signals.

11. The liquid crystal display device according to claim 8, one of said first and second common-electrode signals has an amplitude larger than an amplitude of the other of said first and second common-electrode signals.

12. A terminal unit comprising the liquid crystal display device according to claim 1.

13. A liquid crystal display device comprising:
an array of pixels each including a plurality of sub-pixels;
a plurality of pixel electrodes each disposed in a corresponding one of said sub-pixels; and
a plurality of common electrodes each disposed in a corresponding one of said sub-pixels to oppose a corresponding one of said pixel electrodes, wherein:
one of said common electrodes disposed in each of the sub-pixels in one of said pixels on each row is connected to others of said common electrodes disposed in corresponding sub-pixels in the others of said pixels arranged on said each row, to form a group of common electrodes connected together, and wherein said pixels each include a reflective area and a transmissive area;

said liquid crystal display device further comprises a first peripheral common-electrode line connecting together corresponding common-electrode lines each connected to said group of common electrodes corresponding to said transmissive area, and a second peripheral common-electrode line connecting together corresponding common-electrode lines connected to said group of common electrodes corresponding to said reflective area, wherein said sub-pixels in each of said pixels include at least a first sub-pixel and a second sub-pixel, said first sub-pixel corresponds to said reflective area and said second sub-pixel corresponds to said transmissive area, wherein a gate signal line extends between said first peripheral common-electrode line and said second peripheral common-electrode line.

14. A terminal unit comprising the liquid crystal display device according to claim 13.

* * * * *